P. J. MARKS.
CONTROLLING MECHANISM FOR PHOTOGRAPHIC SHUTTERS.
APPLICATION FILED APR. 2, 1917.

1,240,073.

Patented Sept. 11, 1917.
2 SHEETS—SHEET 1.

WITNESSES:
Nelson H. Copp

INVENTOR
Paul J. Marks
BY
his ATTORNEYS

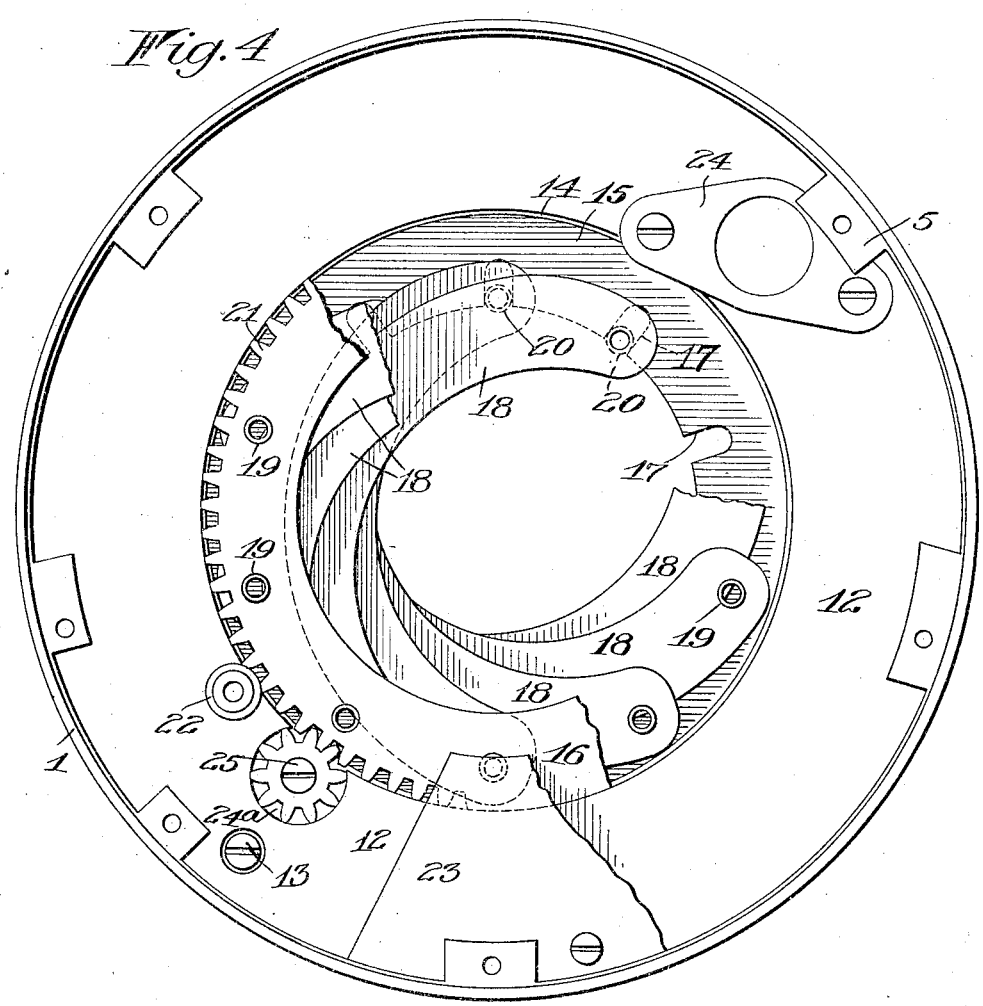

UNITED STATES PATENT OFFICE.

PAUL J. MARKS, OF ROCHESTER, NEW YORK, ASSIGNOR TO EASTMAN KODAK COMPANY, OF ROCHESTER, NEW YORK, A CORPORATION OF NEW YORK.

CONTROLLING MECHANISM FOR PHOTOGRAPHIC SHUTTERS.

1,240,073.   Specification of Letters Patent.   Patented Sept. 11, 1917.

Application filed April 2, 1917. Serial No. 159,216.

*To all whom it may concern:*

Be it known that I, PAUL J. MARKS, of Rochester, in the county of Monroe and State of New York, have invented certain new and useful Improvements in Controlling Mechanisms for Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters of the pivoted blades and symmetrically opening type the mechanism of which is usually housed within an annular casing, and the invention has for its principal object to provide a simple, convenient and efficient construction and arrangement of the parts whereby the blades may be controlled from the exterior of the casing without weakening the latter through the provision of long or numerous openings and without permitting the entrance of dust into the interior. The improvements are further directed toward giving a wide range of movement to the setting element of the controlling device so that its adjustment will be made easy and the scale that indicates its position will not need to have the characters crowded thereon. To these and other ends the invention resides in certain improvements and combinations of parts all as will be hereinafter more fully described, the novel features being pointed out in the claims at the end of the specification.

In the drawings:

Fig. 4 is an enlarged plan view of the interior showing a blade ring and blade mechanism with parts broken away and much of the shutter mechanism removed.

Similar reference numerals throughout the several views indicate the same parts.

Figure 1:
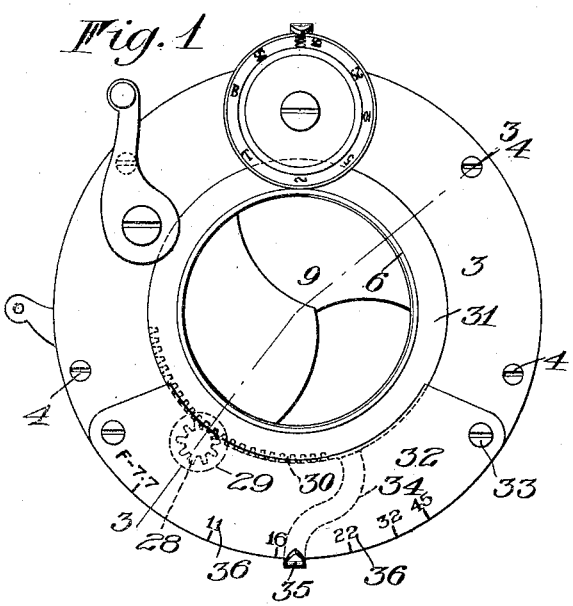
Figure 1 is a front view of a photographic shutter constructed in accordance with and illustrating one embodiment of my invention.
Figure 2:
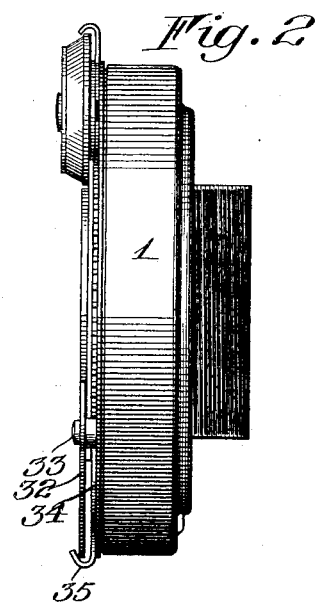
Fig. 2 is a side view thereof.

In the present instance, I have shown my improvement in connection with the iris diaphragm mechanism of the shutter. The body of the casing of the latter is indicated at 1 and shown to be circular or annular in form, the mechanism being housed between its side walls and an interior light tube 2 coincident with the shutter aperture or lens opening. The casing comprises an annular cover plate ring 3 at the front that is secured by screws 4 near its periphery to inwardly turned lugs 5 on the side walls of the body 1 of the casing with which lugs the cover ring comes into direct contact, making a connection that prevents the cover from being warped or distorted through an excessive tightening of the screws. Extending from the margin of the central opening in the cover ring 3 is a collar 6 interiorly threaded at 7 to receive the lens mount, while the back or bottom of the casing body 1 has extended therefrom a threaded collar 8 for attaching the shutter to a camera front or other support, this collar also being coincident with the lens opening.

Figure 3:
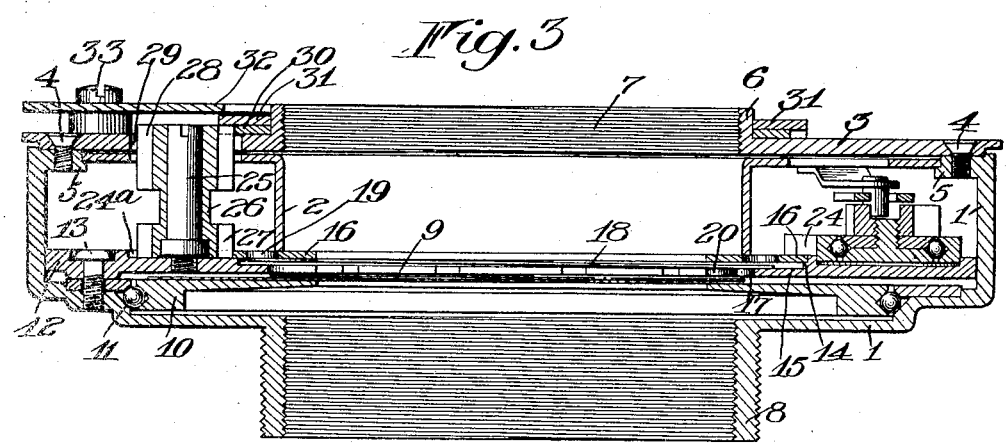
Fig. 3 is an enlarged sectional view taken substantially on the line 3—3 of Fig. 1.

The shutter blades 9 and their operating ring 10 having ball bearings 11 are confined between the back of the casing and a partition member 12 secured by screws 13 to the latter. The partition member 12 is also in the form of a ring at the center of which are formed two rabbeted seats or counterbored depressions 14 and 15 (Fig. 3). The first of these forms a bearing for a diaphragm blade ring 16 and the latter has radial slots 17 and accommodates the diaphragm blades or leaves 18 which are pivoted to the ring at 19 at their ends. The opposite ends of the blades have projections 20 that work in the slots 17 and as the ring 16 is rotated, the blades are opened or closed in the manner usual in such iris diaphragm constructions.

In the practice of my invention, the ring 16 has peripheral teeth 21 which are overlapped by certain parts 22, 23 and 24 of the shutter mechanism to hold the ring in its seat 14 and these teeth intersect a small circular depression 24ª in the partition plate 12 that communicates with the said partition or seat 14. Rising from the center of the depression 24 is a pin 25 fixed to the partition 12 and upon which turns a gear hub 26 having teeth 27 meshing with the teeth 21 of the blade controlling ring 16. Teeth 28 on the hub also extend through a small circular opening 29 in the cover ring 3 of the casing and mesh with a toothed setting ring 30 that turns upon the lens tube or collar 6, being confined by a bearing ring 31 in the present instance. A scale plate 32 that covers the opening 29 is secured in spaced relation to the cover ring 3 by screws 33 and extending from the setting ring 30 beneath this scale plate is a manipulating arm 34 that terminates in a finger 35 bent over to the top of the scale plate to render it accessible to the fingers and to coöperate with the characters 36 of the scale to indicate the adjustment of the diaphragm opening.

The operation of the device is obvious from the foregoing. By moving the arm 34 and indicator 35 to the proper character, the ring 30 on the outside of the shutter rotates the toothed ring 16 on the inside through the medium of the small rotary element or gear 26 and thus changes the positions of the leaves. Heretofore it has been usual to have the operating arm 34 of a controller connected directly to an interior part and extending through a long slot in the casing which slot materially weakened the latter or its cover plate and left the interior open to the entrance of dirt. With the present device, there is only the small covered opening 29 closed almost entirely by the gear 26 itself which neither weakens the cover plate materially nor permits easy communication of the air with the interior. Furthermore, by regulating the proportions of the gearing, the arm 34 may be given any desired amplitude of movement so that the characters 36 need not be crowded on the scale plate and room made for any appropriate word or numeral designations for the different stops. With the structure heretofore used and above referred to, the movement of the arm was made as short as possible so that its slot would be short and the weakening of the casing reduced.

I claim as my invention:

1. The combination with an annular shutter casing having a cover ring provided with an opening, and symmetrically opening pivoted blades within the casing, of a toothed ring within the latter controlling the movement of the blades, a gear extending through the opening in the cover ring and meshing with the toothed ring and a relatively movable rotary setting member on the exterior of the casing for driving the gear.

2. The combination with an annular shutter casing having a cover ring provided with an opening, and symmetrically opening pivoted blades within the casing, of a toothed ring within the latter controlling the movement of the blades, a gear extending through the opening in the cover ring and meshing with the toothed ring, and a rotary toothed setting ring mounted on the cover ring and also meshing with the gear.

3. The combination with an annular shutter casing having a cover ring provided with an opening, and symmetrically opening pivoted blades within the casing, of a toothed ring within the latter controlling the movement of the blades, a gear extending through the opening in the cover ring and meshing with the toothed ring, a rotary toothed setting ring mounted on the cover ring and also meshing with the gear, a scale on the exterior of the casing and an operating arm on the setting ring also constituting an indicator coöperating with the scale.

4. The combination with an annular shutter casing having a cover ring provided with an opening and with a collar forming a lens tube and symmetrically opening pivoted blades within the casing, of a rotary member within the latter controlling the movement of the blades, a gear extending through the opening in the cover ring and adapted to drive the rotary member, and a toothed setting ring having a bearing on the lens tube of the cover ring and meshing with the gear.

5. The combination with a shutter casing having pivoted blades therein, of inner and outer rotary rings carried by the casing, the former controlling the blades and the latter serving as a setting member and a rotary driving connection between the rings.

6. The combination with an annular shutter casing having a cover ring provided with an opening and with a collar forming a lens tube and symmetrically opening pivoted blades within the casing, of a toothed rotary ring within the latter controlling the movement of the blades, a gear extending through the opening in the cover ring and meshing with the toothed ring, a toothed setting ring having a bearing on the lens tube of the cover ring and meshing with the gear, a scale plate covering the opening in the cover ring and in spaced relation to the latter, and an operating arm on the setting ring extending between the cover ring and scale plate and constituting an indicator coöperating with the latter.

PAUL J. MARKS.

Witnesses:
 RUSSELL B. GRIFFITH,
 AGNES NESBITT BISSELL.

Copies of this patent may be obtained for five cents each, by addressing the "Commissioner of Patents, Washington, D. C."